United States Patent [19]

Vergona

[11] Patent Number: 5,764,183
[45] Date of Patent: Jun. 9, 1998

[54] COLOR IMAGING APPARATUS FOR FORMING A BEAM OF LIGHT HAVING THREE SEPARATE COLOR COMPONENTS OPTICAL PRINT HEAD WITH GREEN LED

[75] Inventor: Albert B. Vergona, Rochester, N.Y.

[73] Assignee: Eastman Kodak Company, Rochester, N.Y.

[21] Appl. No.: 639,072

[22] Filed: Apr. 24, 1996

[51] Int. Cl.$^6$ .......................................... B41J 2/47
[52] U.S. Cl. .............................. 347/232; 347/238
[58] Field of Search .................... 347/232, 238, 347/256; 372/39, 43, 45, 49, 50

[56] References Cited

U.S. PATENT DOCUMENTS

| | | | |
|---|---|---|---|
| 4,631,551 | 12/1986 | Vergona | 346/108 |
| 4,982,206 | 1/1991 | Kessler et al. | 347/232 |
| 5,166,703 | 11/1992 | Watanabe et al. | 347/232 |
| 5,179,462 | 1/1993 | Kageyama et al. | 347/232 |
| 5,243,204 | 9/1993 | Suzuki et al. | 257/77 |
| 5,501,990 | 3/1996 | Holm et al. | 257/77 |

OTHER PUBLICATIONS

New Ultra–Bright Green Indium–Gallium Aluminum Phosphide (InGaAlP) LEDs; Ledtronics News, More Choices, More Light; Jun. 27, 1995.
"LED Light Emitting Diode"; Nichia; pp.1–4.

Primary Examiner—Mark J. Reinhart
Attorney, Agent, or Firm—Milton S. Sales

[57] ABSTRACT

A color imaging apparatus, for forming a beam of light having three separate color components for image recording on a photosensitive member, includes red, green, and blue color component light channels, wherein the green light channel is formed by an LED of Gallium Nitride (GaN) material. In another similar color imaging apparatus the green light channel is formed by an LED of Indium Gallium Aluminum Phosphide (InGaAlP) material.

2 Claims, 1 Drawing Sheet

COLOR IMAGING APPARATUS FOR FORMING A BEAM OF LIGHT HAVING THREE SEPARATE COLOR COMPONENTS OPTICAL PRINT HEAD WITH GREEN LED

BACKGROUND OF THE INVENTION

1. Technical Field

This invention relates generally to apparatus which use LED's for forming color images on a photosensitive surface.

2. Background Art

Commonly assigned U.S. Pat. No. 4,631,551 discloses color imaging apparatus using blue, green, and red light channels (typically gas laser), each with an electro-optic modulator, for forming color images on a photosensitive surface. Such apparatus provides high resolution and high speed digital printers. However, the cost of the light sources and electro-optic modulators restrict the use of such apparatus to only the very high-end users such as color laboratory, digital design, advertising, aerial imagery, scientific, and professional photographer markets. Further, while lasers are extremely bright (high energy) and the electro-optic modulators exhibit very wide bandwidth, they produce low contrast and low dynamic range images, resulting in so-called "contouring."

CRT recorders known in the industry are obtainable at much lower cost, but have poor light output and have spot size limitations. Thus, CRT recorders can produce only low quality images that exhibit poor dynamic range.

LED's have high dynamic range, very good image sharpness, wide bandwidths, long life, and low cost. In fact, infrared LED's have been used for exposing photosensitive surfaces such as, for example, silver halide films and paper. Systems that use red, green, and blue LED's to expose such materials have been slow, and/or have had to use multiple LED's to attain sufficient light energy.

It has long been considered that LED's were not suitable for very high-end users such as color laboratory, digital design, advertising, aerial imagery, scientific, and professional photography markets, because of high residual energy needed to expose silver halide materials. Typical energy output from even the highest intensity green LED's has been in the 10 millicandela (mcd) to 50 mcd range. Accordingly, people skilled in the art have not considered LED's to be a viable solution to these markets, and would not have looked to LED's to be able to produce enough light.

DISCLOSURE OF THE INVENTION

It is an object of the present invention to provide apparatus which use blue, green, and red LED's for forming color images on a photosensitive surface, wherein the LED's attain sufficient light energy to form high speed, high resolution, high contrast, and high dynamic range images for very high-end users such as color laboratory, digital design, advertising, aerial imagery, scientific, and professional photography markets.

According to a feature of the present invention, a color imaging apparatus, for forming a beam of light having three separate color components for image recording on a photosensitive member, includes red, green, and blue color component light channels, wherein the green light channel is formed by an LED of Gallium Nitride (GaN) material.

According to another feature of the present invention, a color imaging apparatus, for forming a beam of light having three separate color components for image recording on a photosensitive member, includes red, green, and blue color component light channels, wherein the green light channel is formed by an LED of Indium Gallium Aluminum Phosphide (InGaAlP) material.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which the figure is a schematic illustration of a color imaging apparatus in accordance with the present invention.

BEST MODE FOR CARRYING OUT THE INVENTION

Figure 1:
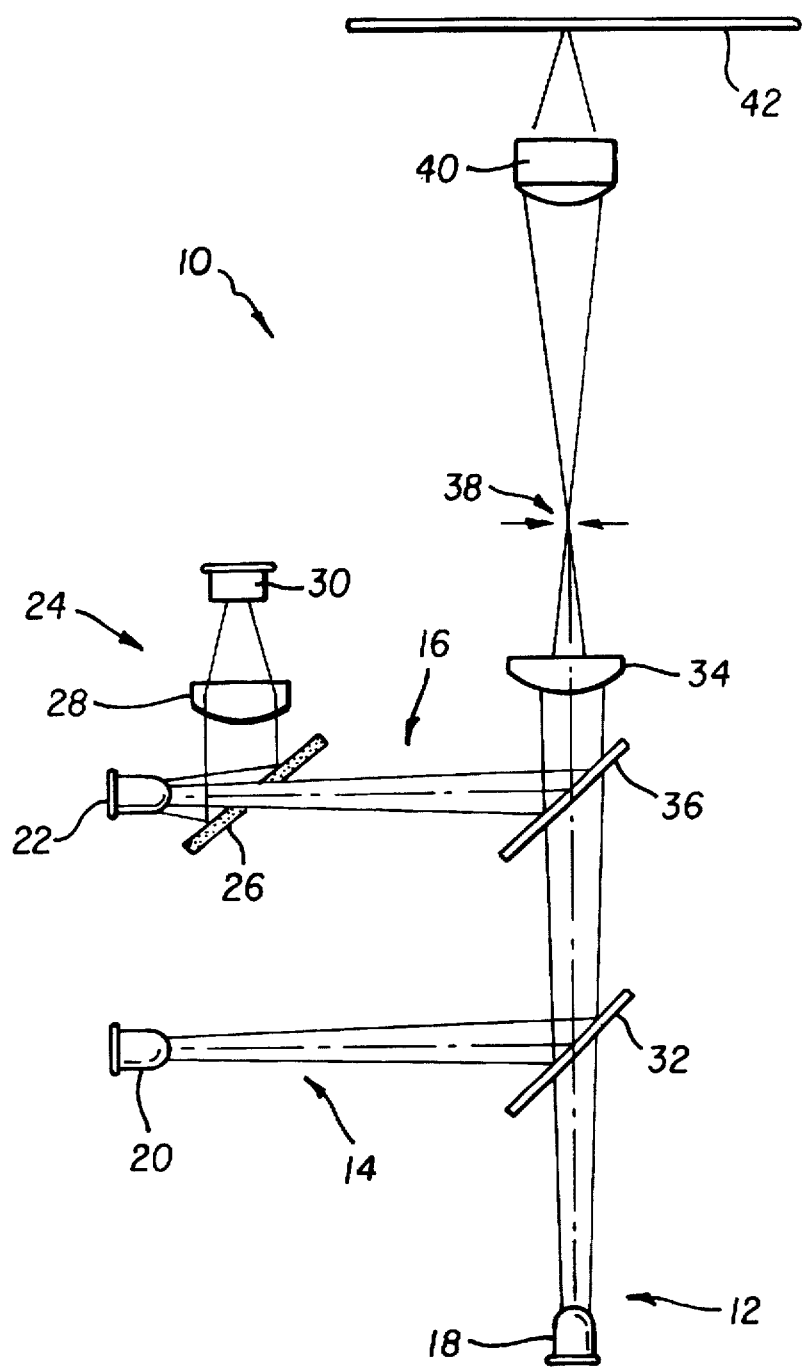

The present description will be directed in particular to elements forming part of, or cooperating more directly with, apparatus in accordance with the present invention. It is to be understood that elements not specifically shown or described may take various forms well known to those skilled in the art.

The drawing schematically illustrates one preferred embodiment which can accomplish color imaging in accordance with the present invention. The apparatus, denoted generally 10, comprises blue, green and red light channels 12, 14 and 16, respectively. Each light channel includes a respectively colored LED 18, 20, and 22. Each channel includes a feedback arrangement 24 for a servo circuit (not shown). For clarity, only the green channel feedback arrangement is illustrated, but it will be understood that similar feedback arrangements will typically be provided on the red and blue channels. The feedback arrangements include a bifurcating mirror 26, a focusing lens 28, and a photodetector 30.

Light from red channel 14 is incident upon a dichroic mirror 32. Mirror 32 changes the direction of this blue light and directs it to a focusing lens 34. In a similar fashion, the green light from the channel 16 is directed by a mirror 36 to lens 34. As shown, dichroic mirror 32 receives light from blue channel 12 and passes the blue light to mirror 36. Mirror 36 does not change the direction of this blue light, which is directed to focusing lens 34.

Lens 34 combines the red, green and blue light beam components and focuses them as a single beam at an aperture 38. Light passes through aperture 38 and is focused by a lens 40 to a spot on the surface of a photosensitive member 42. The photosensitive member will be understood to include both silver and non-silver color-sensitive imaging material.

Details of systems for scanning the spot across the surface of the photosensitive member, for inputting analog electrical signals representative of a color digital image to the LED's, and for controlling the LED light output by the photodiode servo circuits are well known. For example, abovementioned U.S. Pat. No. 4,631,551 discloses several such systems.

According to a feature of the present invention, green LED 22 is formed of Gallium Nitride (GaN) material. Such LED's are commercially available from Nichia Chemical Industries, LTD of Tokushima, Japan. These GaN LED's are generally used to produce blue wavelengths, but I have discovered that, with a color filter, there is sufficient energy in the green spectrum (around 550 nm) to expose daylight-sensitive photosensitive materials such as Ektachrome 100 and Vericolor VPS at exposure times acceptable in present digital imaging markets to expose film.

According to another feature of the present invention, green LED 22 is formed of Indium Gallium Aluminum Phosphide (InGaAlP) material. Such LED's are commercially available from Ledtronics, Inc. of California, U.S.A. These InGaAlP LED's produce 1200 mcd in the green spectrum, enough to expose daylight-sensitive photosensitive materials such as Ektachrome 100 and Vericolor VPS at exposure times acceptable in present digital imaging markets to expose film.

The invention has been described in detail with particular reference to preferred embodiments thereof, but it will be understood that variations and modifications can be effected within the spirit and scope of the invention.

What is claimed is:

1. Color imaging apparatus for forming a beam of light having three separate color components for image recording on a photosensitive member, said apparatus comprising a red color component light channel including a red colored LED, a green color component light channel including a green colored LED, and a blue color component light channel including a blue colored LED, wherein the green colored LED is formed of Gallium Nitride (GaN) material.

2. Color imaging apparatus for forming a beam of light having three separate color components for image recording on a photosensitive member, said apparatus comprising a red color component light channel including a red colored LED, a green color component light channel including a green colored LED, and a blue color component light channel including a blue colored LED, wherein the green colored LED is formed of Indium Gallium Aluminum Phosphide (InGaAlP) material.

* * * * *